(12) United States Patent
Kristensen et al.

(10) Patent No.: US 10,697,892 B2
(45) Date of Patent: Jun. 30, 2020

(54) CUVETTE AND METHOD FOR MEASURING REFRACTIVE INDEX IN A SPECTROPHOTOMETER

(71) Applicant: Danmarks Tekniske Universitet, Kgs. Lyngby (DK)

(72) Inventors: Anders Kristensen, Frederiksberg C (DK); Kristian Tølbøl Sørensen, Frederiksberg C (DK); Emil Højlund-Nielsen, Copenhagen Ø (DK)

(73) Assignee: Danmarks Tekniske Universitet, Kgs. Lyngby (DK)

( * ) Notice: Subject to any disclaimer, the term of this patent is extended or adjusted under 35 U.S.C. 154(b) by 0 days.

(21) Appl. No.: 16/071,047

(22) PCT Filed: Jan. 26, 2017

(86) PCT No.: PCT/DK2017/050018
§ 371 (c)(1),
(2) Date: Jul. 18, 2018

(87) PCT Pub. No.: WO2017/129196
PCT Pub. Date: Aug. 3, 2017

(65) Prior Publication Data
US 2019/0025205 A1    Jan. 24, 2019

(30) Foreign Application Priority Data

Jan. 26, 2016  (EP) ........................... 16152817
Oct. 14, 2016  (DK) ............................ 2016 70814
Oct. 14, 2016  (EP) ........................... 16194025

(51) Int. Cl.
*G01J 3/427*   (2006.01)
*G01N 21/41*   (2006.01)
(Continued)

(52) U.S. Cl.
CPC ........ *G01N 21/4133* (2013.01); *G01J 3/0208* (2013.01); *G01N 21/0303* (2013.01);
(Continued)

(58) Field of Classification Search
CPC ............... G01N 21/4133; G01N 21/03; G01N 21/0303; G01N 21/253; G01N 21/31;
(Continued)

(56) References Cited

U.S. PATENT DOCUMENTS 7,522,786 B2 *  4/2009  Kiesel ...................... G01J 3/02
                                                      356/451
2003/0049693 A1  3/2003  Goh et al.
(Continued)

FOREIGN PATENT DOCUMENTS

EP   1 500 434 A1    1/2005
JP   2007-163181 A   6/2007
(Continued)

OTHER PUBLICATIONS

Two-dimensional silicon photonic crystal based biosensing platform for protein detection, Apr. 16, 2007/ vol. 15, No. 8 / Optics Express 4530 (Year: 2007).*
(Continued)

*Primary Examiner* — Tarifur R Chowdhury
*Assistant Examiner* — Jonathon Cook
(74) *Attorney, Agent, or Firm* — Knobbe Martens Olson & Bear LLP (57) ABSTRACT

Embodiments of the present invention include a cuvette (100) for use in determining a refractive index of a sample matter in a spectrophotometer (600), the cuvette comprising a container (102) for holding the sample matter, the container (102) having an entry window (121) that allows input radiation to reach the sample matter, the container furthermore having an exit window (122) that allows a part of the
(Continued)

input radiation to exit the container part, the entry window and the exit window defining a radiation path; and comprising a photonic crystal (101) rigidly attached to the container or integrally formed in the container and arranged in the radiation path, the photonic crystal having a grating part (111) causing a reflectance spectrum of the photonic crystal to exhibit a resonance. A spectrophotometer is also provided.

10 Claims, 7 Drawing Sheets

(51) Int. Cl.
*G02B 1/00* (2006.01)
*G01N 21/77* (2006.01)
*G01N 21/25* (2006.01)
*G01J 3/02* (2006.01)
*G01N 21/03* (2006.01)
*G01N 21/31* (2006.01)
*G02B 6/12* (2006.01)

(52) U.S. Cl.
CPC .......... *G01N 21/253* (2013.01); *G01N 21/31* (2013.01); *G01N 21/774* (2013.01); *G02B 1/005* (2013.01); *G01N 2021/0307* (2013.01); *G02B 2006/1213* (2013.01)

(58) Field of Classification Search
CPC ......... G01N 21/774; G01N 2021/0307; G02B 1/005; G02B 2006/1213; G01J 3/0208
USPC .................................. 356/319, 246
See application file for complete search history.

(56) References Cited

U.S. PATENT DOCUMENTS

| | | |
|---|---|---|
| 2006/0057707 A1 | 3/2006 | Cunningham et al. |
| 2006/0193552 A1 | 8/2006 | Sugita |
| 2007/0009968 A1 | 1/2007 | Cunningham et al. |
| 2007/0014505 A1 | 1/2007 | Hosomi et al. |
| 2007/0081155 A1 | 4/2007 | Schembri et al. |
| 2008/0246961 A1 | 10/2008 | Zhang et al. |
| 2009/0079976 A1 | 3/2009 | Cunningham |
| 2010/0085566 A1 | 4/2010 | Cunningham |
| 2012/0258549 A1 | 10/2012 | Lu et al. |
| 2012/0309080 A1 | 12/2012 | Cunningham et al. |
| 2013/0093936 A1 | 4/2013 | Scheeline et al. |

FOREIGN PATENT DOCUMENTS

| | | |
|---|---|---|
| WO | WO 2008/060415 A1 | 5/2008 |
| WO | WO 2014/089120 A1 | 6/2014 |
| WO | WO 2015/155349 A1 | 10/2015 |
| WO | WO 2015/169324 A1 | 11/2015 |

OTHER PUBLICATIONS

Liquid-infiltrated photonic crystals: enhanced light-matter interactions for lab-on-a-chip applications, Mortensen, N.A., Xiao, S. & Pedersen, J. Microfluid Nanofluid (2008) 4: 117. https://doi.org/10.1007/s10404-007-0203-2 (Year: 2008).*

Hermannsson, Pétur G. et al., "Refractive index dispersion sensing using an array of photonic crystal resonant reflectors" Applied Physics Letters, 2015, pp. 061101-1-061101-4, vol. 107.

Hermannsson, Pétur Gordon et al., "Absolute analytical predication of photonic crystal guided mode resonance wavelengths" Applied Physics Letters, 2014, pp. 071103-1-071103-4, vol. 105.

Hermannsson, Pétur G. et al., "All-polymer photonic crystal slab sensor" Optics Express, Jun. 2015, pp. 16529-16539, vol. 23, No. 13.

Vannahme, Christoph et al., "Nanoimprinted distributed feedback lasers comprising TiO$_2$ thin films: Design guidelines for high performance sensing" Laser Photonics Rev., 2013, pp. 1036-1042, vol. 7, No. 6.

International Search Report for PCT/DK2017/050018 dated May 22, 2017.

* cited by examiner

CUVETTE AND METHOD FOR MEASURING REFRACTIVE INDEX IN A SPECTROPHOTOMETER

CROSS REFERENCE TO RELATED APPLICATIONS

This application is a U.S. National Phase Application of PCT International Application Number PCT/DK2017/050018, filed on Jan. 26, 2017, designating the United States of America and published in the English language, which is an International Application of and claims the benefit of priority to European Patent Application No. 16152817.9, filed on Jan. 26, 2016, Danish Patent Application No. PA 2016 70814, filed on Oct. 14, 2016, and European Patent Application No. 16194025.9, filed on Oct. 14, 2016. The disclosures of the above-referenced applications are hereby expressly incorporated by reference in their entireties.

BACKGROUND OF THE INVENTION

Spectrophotometers are ubiquitous in science, technology, education and medicine, and can generally measure absorbance of for instance a liquid as a function of wavelength. The liquid is contained in a so-called cuvette, which can be made for instance from polymer, glass or quartz. The cuvette is placed into a slot in the spectrophotometer. By correlating the resulting absorption spectrum to a known calibration curve for a specific compound, the concentration of that compound can easily be calculated using Lambert-Beers law.

However, for non-absorbing compounds, spectrophotometers are not usually suitable for determining concentrations. An alternative method to determining concentrations uses a refractometer, which measures refractive index of the liquid. However, such equipment can be expensive and is much less common. In particular, refractometers that can measure at multiple wavelengths are prohibitively expensive. Since concentration of a specific compound in e.g. a liquid sample is often correlated with the index of refraction of the liquid sample including the compound, a calibration for that specific compound in the liquid can be used to obtain the concentration based on a measurement of the index of refraction.

SUMMARY OF THE INVENTION

A first aspect of the present invention provides a cuvette for use in determining a refractive index of a matter sample in a spectrophotometer. The cuvette comprises
a container for holding the matter sample, the container having an entry window that allows input radiation to reach the matter sample, the container furthermore having an exit window that allows a part of the input radiation to exit the container part, the entry window and the exit window defining a radiation path,
a photonic crystal rigidly attached to a side of the container or integrally formed in a side of the container and arranged in the radiation path, the photonic crystal having a grating part causing a reflectance spectrum of the photonic crystal to exhibit a resonance.

Such a cuvette is useful for determining for instance a refractive index of a matter sample, such as a liquid sample, or a concentration of a compound in a liquid.

The fact that the photonic crystal is arranged in the side of the container means that at least some precipitates in a matter sample can settle at the bottom of the cuvette where they do not interfere with input radiation, whereby they in turn do not influence measurements.

Cuvettes having a photonic crystal arranged at the bottom of their container part are unable to provide this very important effect.

The grating part may have a uniform grating. Alternatively or additionally, the grating is pseudo-periodic. Alternatively or additionally, the grating part has a chirped grating part. In some embodiments, the grating part has two or more sections having different grating structures. For instance, a first section has a first grating period and a second section has a second grating period different from the first grating period. The grating part may have further sections.

Having multiple sections allows for a method of determining a dispersion of a compound, comprising: measuring a refractive index at least at a first and a second resonance wavelength in a photonic crystal comprising at least the first and second sections, and optionally further sections, just described.

In some embodiments, the grating part comprises a one-dimensional grating. Some embodiments comprise a two-dimensional grating in the grating part. Some embodiments comprise a three-dimensional grating in the grating part.

Preferably, the cuvette is suitable for use in a spectrophotometer.

In some embodiments, the grating part is formed at least partially from a polymer material. The polymer could be PMMA, EFiRon, or HI01XP, or equivalent or similar polymers.

Some embodiments of the first aspect are suitable for existing spectrophotometers, the container is preferably of a size suitable for existing spectrophotometers. In some embodiments, the cuvette has a footprint of 12.5 mm×12.5 mm. In other embodiments, the cuvette is cylindrical to suit cuvette receptacles in spectrophotometers having a cylindrical receptacle. Preferably the cuvette has a square footprint, since this allows the cuvette to accurately be inserted in two ways in the spectrophotometer: 1) The photonic crystal is in the radiation path of the spectrophotometer light source, 2) The photonic crystal is not in the radiation path of the spectrophotometer light source. This is obtained simply by rotating the cuvette with respect to the spectrophotometer's cuvette receptacle. In some embodiments, absorption and refractive index can be determined simultaneously in one measurement.

In some embodiments, the grating part is a planar grating and the photonic crystal is arranged so that the planar grating is normal to the radiation path. This enables normal radiation incidence, which often provides the most efficient coupling of the radiation into the matter sample.

Some embodiments comprise a polarization filter at the entry window. Some embodiments comprise polarization filter at the exit window. This may for instance prevent mixing of TE and TM polarization specific features such as resonances, in the spectrum, making them simpler to interpret. In some embodiments, the grating part is a planar grating and the photonic crystal is arranged so that a normal to the planar grating is within 10 degrees of a normal to a surface part of the container to which the photonic crystal is attached. In some embodiments, the normal is within 20 degrees. In some embodiments, the normal is within 45 degrees.

In some embodiments, the cuvette is configured so that the radiation path coincides with a path followed by radiation from a spectrophotometer light source in a spectrophotometer in which the cuvette is suitable.

A second aspect provides a spectrophotometer for characterizing a refractive index of a matter sample. The spectrophotometer comprises
- a cuvette receptacle configured to receive a cuvette in accordance with an embodiment in accordance with the first aspect of the invention,
- a spectrophotometer light source arranged to provide input radiation along the radiation path of the cuvette,
- a spectrometer arranged to receive non-absorbed parts of the input radiation from the exit window and to determine a spectrum based on said non-absorbed parts, and to determine a resonance wavelength or resonance frequency or other resonance property in the spectrum, the spectrophotometer being configured to determine the refractive index by solving a set of suitable optical equations that take into account at least 1) optical and physical characteristics of the photonic crystal, 2) the determined resonance wavelength or resonance frequency or said other resonance property, the refractive index being an unknown to be solved for in said set of suitable equations.

The skilled person will readily appreciate that "a set of suitable optical equations" means a set of equations or other model or empirical formulation that allows for determining the refractive index based on the optical elements involved, including the cuvette and ultimately a matter sample held by the cuvette. The selection of equations may be selected based for instance on limitations in available computing power (more complex equations typically require more computing power), and/or be selected based on the precision required of the solution representing the refractive index (more detailed models may give a more precise result, whereas approximations and simple models may lead to a less precise result). Accordingly, many different implementations can be applied in respect of the set of suitable optical equations. Among other sources, textbooks and scientific papers are available that will readily allow the person skilled in the art to provide a set of suitable optical equations that may be used in methods and apparatuses disclosed in the present specification.

As is evident for the person skilled in the art, the set of equations may comprise an analytical or a semi-analytical expression or experimentally determined relationship between relevant parameters.

In some embodiments, two or more spectral components in the spectrum are measured in the spectrophotometer and used to characterize the resonance, and in particular used as input to the set of optical equations in order to solve for the refractive index—described above—or other relevant characteristic. This allows for a determination that, to lesser or greater extent—take into account a shape of the resonance, such as a peak-to-width property determined based on the measured values. Alternatively or additionally, the model may compare an amplitude or equivalent value of each of a plurality of measured spectral components with an expected value (in relative terms) for said each spectral component, for instance as predicted by an at least partly analytical model and/or an at least partly semi-analytical model, or based at least partly on a table of expected values. An asymmetry in the resonance, determined based on measured spectral components, can in some cases be used to determine the relevant parameter, such as the refractive index, as part of the set of optical equations.

In some embodiments, the spectrophotometer further comprises a mirror system configured to guide input light reflected by the photonic crystal to the spectrometer.

A third aspect provides a method for determining a refractive index of a matter sample in a spectrophotometer. The method comprises
- inserting a cuvette in accordance with an embodiment of the first aspect of the invention into a cuvette receptacle of a suitable spectrophotometer, the cuvette comprising the matter sample,
- irradiating the matter sample with input radiation along the radiation path,
- recording a spectrum of non-absorbed parts of the input radiation using the spectrometer,
- determining the refractive index of the matter sample by solving a set of suitable optical equations that take into account at least 1) optical and physical characteristics of the photonic crystal, 2) the determined resonance wavelength or resonance frequency, the refractive index being an unknown to be solved for in said set of suitable equations.

In an aspect, the invention also provides, more generally:
A method for determining an optical characteristic or material characteristic of a matter sample in a spectrophotometer, the method comprising
- inserting a cuvette in accordance with an embodiment of the first aspect of the invention into a cuvette receptacle of a suitable spectrophotometer, the cuvette comprising the matter sample,
- irradiating the matter sample with input radiation along the radiation path,
- recording a spectrum of non-absorbed parts of the input radiation using the spectrometer,
- determining said characteristic of the matter sample by solving a set of suitable optical equations that take into account at least 1) optical and physical characteristics of the photonic crystal, 2) a determined resonance wavelength or resonance frequency or other resonance property of the spectrum, said characteristic being an unknown to be solved for in said set of suitable equations.

In some embodiments, the characteristic is a refractive index of the material, and the method is accordingly adapted to solve for the refractive index.

In some embodiments, the characteristic is a concentration of the material in the matter sample. The set of suitable optical equations further comprises a predetermined relationship for converting, for said material, a resonance wavelength or resonance frequency determined by the spectrophotometer into a concentration of said material.

A fourth aspect provides software which, when executed on a digital processor arranged in a suitable spectrophotometer, enables the spectrophotometer to perform the irradiating, recording and determining steps in embodiments of a method aspect of the present invention, such as the third aspect or the more general aspect for determining an optical characteristic or a material characteristic.

A fifth aspect provides a spectrophotometer for determining a concentration of a material in a matter sample. The spectrophotometer comprises
- a cuvette receptacle configured to receive a cuvette in accordance with an embodiment in accordance with the first aspect of the invention,
- a spectrophotometer light source arranged to provide input radiation along the radiation path of the cuvette,
- a spectrometer arranged to receive non-absorbed parts of the input radiation from the exit window and to determine a spectrum based on said non-absorbed parts, and to determine a resonance wavelength or resonance frequency or other resonance property in the spectrum, the spectrophotometer further being configured to determine the concentration by solving a set of suitable optical equations that take into account at least 1) optical and physical characteristics of the photonic crystal, 2) the determined resonance wavelength or resonance frequency or said other resonance property, 3) a predetermined relationship for converting, for said material, a resonance wavelength or resonance frequency or other resonance property determined by the spectrophotometer into a concentration of said material.

The material may be a single chemical compound or mix of multiple compounds, fluids (both liquid and gaseous), polymer or polymers; biological or synthetic fluid or fluids; acid or acids; base or bases; raw or pre-processed materials, or any other material that is suitable for being a least partly characterized using a spectrophotometer. In any case, the material may be liquid or solid, or a mixture thereof, whether it comprises one or several different materials, such as the ones mentioned in the present paragraph or elsewhere in the present specification. In some cases, certain materials falling within the group of materials described above are not suitable, at least for some concentrations within the matter sample, for being characterized in a spectrophotometer. Embodiments of spectrophotometers in accordance with the present invention may or may not be able to overcome such limitations.

In some embodiments of the fifth aspect, the spectrophotometer comprises a selector unit allowing a user to select between at least two different materials or mixture of materials, and in response, the spectrophotometer determines the concentration by using the predetermined relationship corresponding to the selected material or mixture of materials.

In some embodiments, the predetermined relationship for the material the concentration of which is to be determined, represents the relationship for the material mixed in a (substantially) known medium, such as but not limited to: water, alcohol, acid or acids, base or bases, or other medium, fluid or solid, or a mix of such materials.

The discussion above relating to "a set of suitable optical equations" applies equally to the fifth aspect and any other aspects that involve such a set of suitable optical equations. Persons skilled in the art will also appreciate that similar considerations apply to the "predetermined relationship".

A sixth aspect provides a method for manufacturing a cuvette in accordance with an embodiment of the first aspect of the invention. The method comprises:
providing a cuvette having a container part for holding a fluid sample,
providing a photonic crystal having a first side with a grating part,
adding curable liquid to the photonic crystal on a side opposite the first side, or to part of an inside of the container part,
positioning the crystal with curable liquid inside the container part in a position with the curable liquid in contact with the inside of the container part, in a position where a fluid sample can get into contact with the photonic crystal,
curing the curable liquid by exposing it to curing radiation, whereby the photonic crystal becomes rigidly attached to the container part.

In a seventh aspect, the invention provides a method for manufacturing a cuvette in accordance with an embodiment of the first aspect of the invention. The method comprises:
providing a photonic crystal having a first side having a grating part, and having a second side opposite the first side,
providing a cuvette mold having a first mold part defining an inside surface of the cuvette and having a second mold part defining an outside surface of the cuvette,
arranging and maintaining the photonic crystal with the first side facing the first mold part in a position corresponding to a cuvette side wall,
filling the mold with cuvette material, whereby the photonic crystal becomes partly embedded in the cuvette due to the cuvette material getting into contact at least with the second side of the photonic crystal.

The photonic crystal can for instance be maintained in the position by using a cuvette mold having a hole in the first mold part and providing suction at the hole and placing, before or after providing the suction, the photonic crystal at the hole with the first side of the photonic crystal facing the hole. Alternatively, the photonic crystal is held in position by an adhesive. When the first mold part is removed, the adhesive can be removed from the grating part.

The cuvette material is preferably made of a polymer, such as polystyrene poly(methyl methacrylate), polypropylene or polycarbonate.

An eighth aspect of the invention provides a method for manufacturing a cuvette in accordance with an embodiment of the first aspect of the invention. The method comprises:
providing a first cuvette part having a slab with an in-plane photonic crystal with a grating part at a first side of the slab, the slab corresponding to at least a part of a side wall of the cuvette,
providing a second cuvette part having an opening corresponding to a size of the slab,
arranging the slab in the opening with the grating part facing an inside of the cuvette,
establishing a seal between the slab and the second cuvette part.

Often, the cuvette has a square footprint. In that case, the slab could constitute an entire side wall of the cuvette, or it could be a part of a side wall.

The slab and second cuvette parts are sealed together for instance by adhesion bonding, ultrasonic bonding or thermal bonding.

DETAILED DESCRIPTION OF SELECTED EMBODIMENTS

Figure 1:
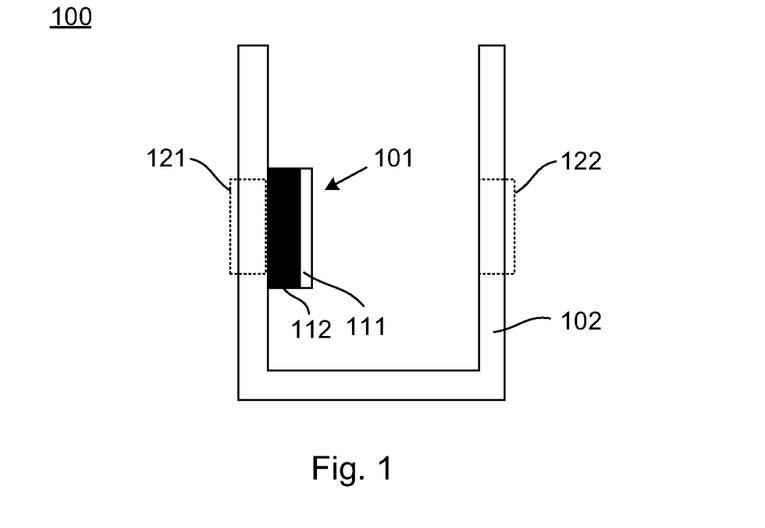
FIG. 1 illustrates a cuvette in accordance with an embodiment of the invention.

FIG. 1 illustrates a cuvette in accordance with an embodiment of the present invention. It has a container 102 for holding a sample, such as a fluid sample. Inside the container is a photonic crystal 101 that has been attached to the container. The photonic crystal comprises a grating part 111 and a substrate part 112. In this specification, the cuvette will be referred to as a nanocuvette, due to the presence of the grating in the cuvette. For many applications, a typical grating period is on the nanometer-scale, such as in the range 100 nm to 1000 nm.

The container part has an entry window 121 and an exit window 122. Input radiation can enter the entry window in order to reach the fluid sample. There, the radiation interacts with the photonic crystal and the fluid, while propagating towards the exit window 122, where it exits the nanocuvette.

Figure 2:
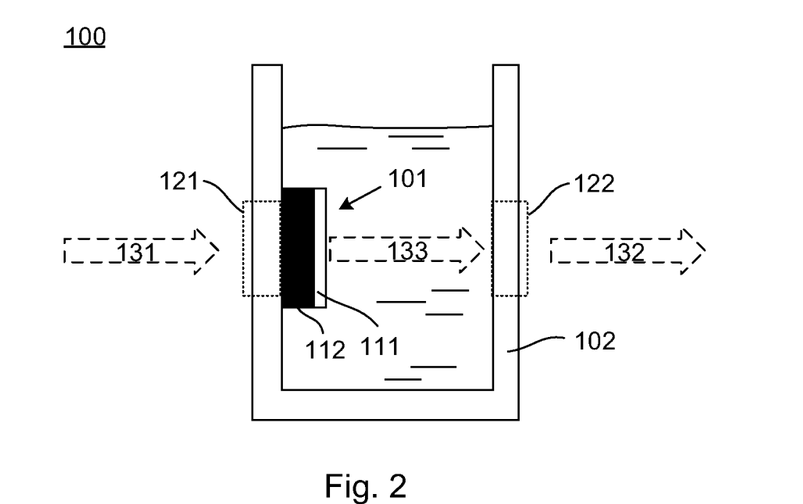
FIG. 2 illustrates a radiation path in a cuvette in accordance with an embodiment of the invention for a transmission measurement.

FIG. 2 illustrates the radiation path in a nanocuvette used in a transmission-type setup. This is the standard mode of operation in a spectrophotometer. The nanocuvette in FIG. 2 contains a fluid sample that covers the photonic crystal. Input radiation schematically illustrated with dashed arrow 131 enters the cuvette where it propagates through the fluid sample, as illustrated schematically by dashed arrow 133. At the other side of the cuvette, radiation exits the nanocuvette along the radiation path, as schematically illustrated by dashed arrow 132.

The container part may be of a standard size, whereby it can be used in existing spectrometers. When the nanocuvette 100 is used in a spectrophotometer, the transmission spectrum will differ from the transmission spectrum that would be obtained with the same spectrophotometer, had a conventional cuvette been used. The presence of the photonic crystal causes resonant reflection. Light with wavelengths near the resonance wavelength are not transmitted.

The grating part is defined by a periodically varying modulation of the refractive index. The grating part may have recesses that are susceptible to being filled with material with which it is brought into contact, for instance a liquid sample in the container. Thus, when the container 102 is filled with fluid, the photonic crystal recesses will be filled by fluid. Alternatively, the grating part is buried, for instance by a polymer. In yet another embodiment, the grating part is uniform in a direction normal to the grating plane.

The photonic crystal has a resonance wavelength, $\lambda_R$, at which normally incident light with a particular polarization, for instance transverse-electric (TE) polarized, is reflected with almost 100% efficiency. The resonance wavelength depends on the grating characteristics, i.e. the distribution of materials with high and low refractive indices. The photonic crystal resonance can be characterized for instance by determining a transmission spectrum.

When the photonic crystal becomes immersed in fluid, the resonance wavelength shifts depending on the characteristics of the fluid.

Figure 3:
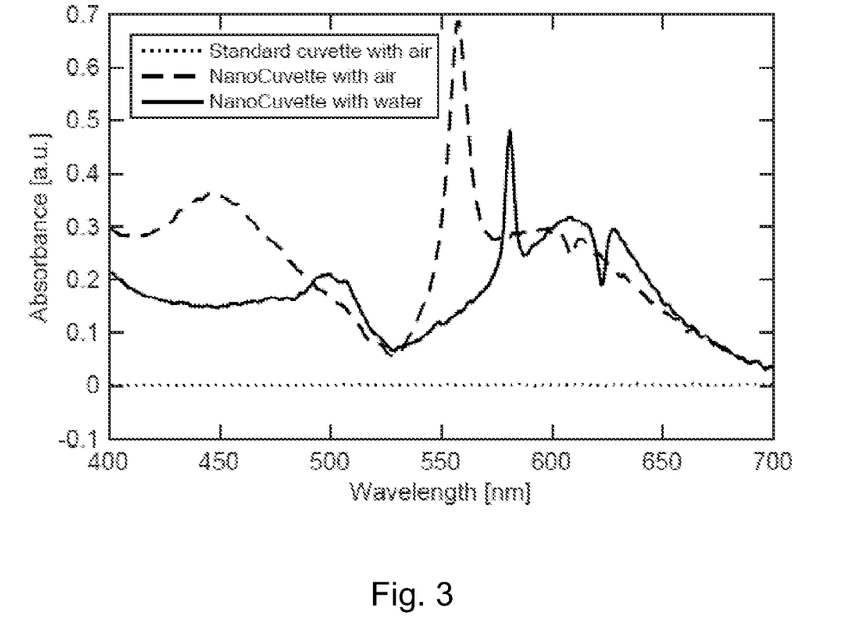
FIG. 3 shows measurement of spectra for a prior art cuvette and a cuvette in accordance with an embodiment of the invention.

FIG. 3 shows spectra provided by a Thermo Scientific NanoDrop 2000c spectrophotometer measuring transmitted light through a nanocuvette in accordance with an embodiment of the invention. FIG. 3 shows three spectra measured in the wavelength range 400 nm to 700 nm. The first spectrum is the absorbance for an empty standard cuvette (i.e. a cuvette without a photonic crystal). The measured absorbance data are calibrated so that the absorbance spectrum for the empty cuvette is substantially flat and zero.

FIG. 3 also shows the spectrum for an empty nanocuvette in accordance with an embodiment of the invention. The corresponding graph in FIG. 3 is labeled "NanoCuvette with air". When the cuvette is empty, the photonic crystal is in contact with air, air acting as a fluid sample. (The data in FIG. 3 are the raw data provided by the spectrophotometer.) The spectrum varies substantially across the wavelength range from 400 nm to 700 nm. One feature is a clear resonance near 558 nm, which is the result of resonant reflection by the photonic crystal in contact with the fluid.

FIG. 3 furthermore shows the spectrum when the nanocuvette is filled with water. The water is in contact with the photonic crystal, changing (in this case red-shifting) the resonant reflection wavelength compared to the measurement in air. Accordingly, the spectrum changes from that of the empty nanocuvette. For instance, the resonance moves to a longer wavelength of 581 nm. The general spectral shape is similar for measurements in air and water. The general tendency is that features move to longer wavelengths for higher refractive index of the fluid sample.

By analyzing the spectrum of a filled nanocuvette, it is possible to determine the refractive index of the fluid. This can for instance be done numerically by an iterative process, taking refractive index dispersion of the constituent materials into account. Alternatively, spectrum measurements on a set of refractive index calibration liquids provide references for the relationship between resonance wavelength and refractive index, for one particular photonic crystal. Such relationships are typically non-linear. The references can be used to infer a refractive index for a sample with an unknown refractive index.

Alternatively, the reference data can be provided using computer simulations, where absorbance spectra are calculated for different fluids.

Another method of determining the refractive index of the sample based on the measured absorbance spectrum involves solving a set of electromagnetic equations by digital computer means. The photonic crystal structure is known, whereas the fluid is presumed not to be. The solving amounts to finding a refractive index that gives the resonance seen in the measured spectrum. A person skilled in the art will readily know how to provide equations suitable for obtaining the refractive index. Exemplary suitable equations and underlying principles are described in detail for instance in "Absolute analytical prediction of photonic crystal guided mode resonance wavelengths" (APPLIED PHYSICS LETTERS 105, 071103 (2014)) by Hermannsson et al. In the context of this article, the value to be determined for the purpose of the present invention is the index of the "superstrate". The article "Refractive index dispersion sensing using an array of photonic crystal resonant reflectors" (APPLIED PHYSICS LETTERS 107, 061101 (2015) by Hermannsson et al. describes an example in which an analytical expression is provided for the index of refraction of the "superstrate", see equation (6) therein. This method can be used for the purpose of determining the index of refraction of the liquid sample in the present invention. The two references are hereby incorporated by reference.

To summarize, the inventors have provided a cuvette that makes it possible to determine the index of refraction of a fluid using a standard spectrophotometer and specially configured software adapted to enable the calculations described above.

Figure 4:
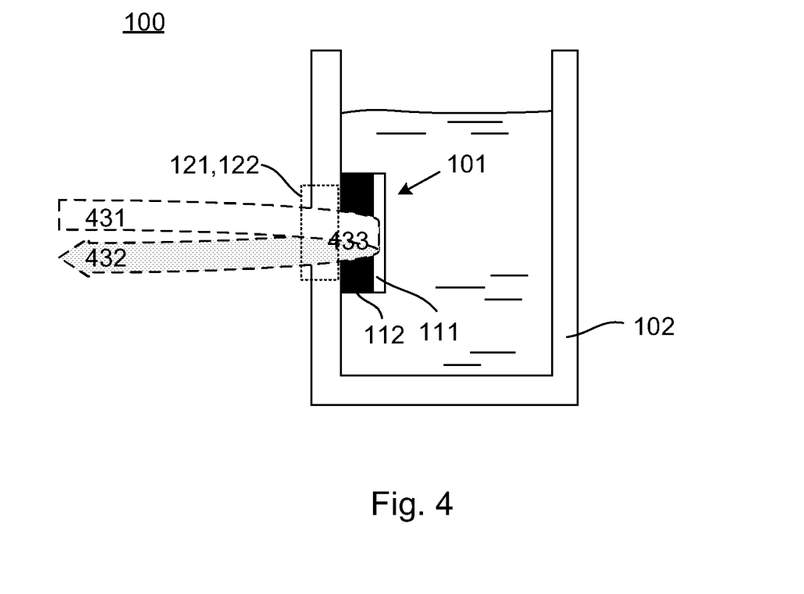
FIG. 4 illustrates a radiation path in a cuvette in accordance with an embodiment of the invention for a reflection measurement.

FIG. 4 illustrates operation in a reflection-type setup. The entry window also acts as exit window. Input radiation, schematically illustrated by dashed arrow 431, enters the nanocuvette through entry window 121 and interacts with the photonic crystal and any fluid in contact with the photonic crystal. Reference number 433 is situated in the region where the interaction is primarily taking place. Instead of, or in addition to, determining the transmitted radiation (arrow 132 in FIG. 2), the reflected radiation, schematically illustrated by dashed arrow 432, can be characterized in a manner similar to that with which the transmitted radiation was characterized, described above. The electromagnetic equations are similar to those used for determining the refractive index in the transmission setup. In the transmission setup, the resonance shows up as a peak in the absorbance spectrum. In the reflection setup, the resonance will show up as a peak in the reflectance spectrum. The purpose of the calculations is to determine that refractive index which, when assumed to be in contact with the photonic crystal and extending away from it on the opposite side of the substrate part 112, results in the resonance seen in the reflectance spectrum.

For illustrative purposes only, the highly schematic illustration of the radiation path in FIG. 4 shows incoming radiation 431 and outgoing radiation 432 as not overlapping. In practice, they overlap in many advantageous embodiments. This would be the case for instance when the input radiation enters the cuvette in a direction normal to the cuvette surface plane and the grating is parallel with the cuvette surface plane. In any case, the dashed arrows illustrating radiation in FIGS. 2 and 4 should not be construed as limiting the nanocuvette design or imposing requirement on the method by which the nanocuvette is used.

Figure 5:
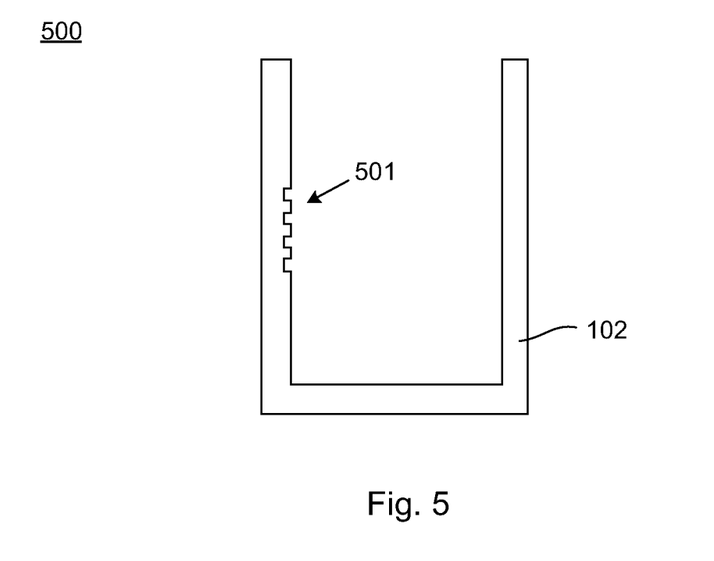
FIG. 5 illustrates a photonic crystal integrally formed with a container.

FIG. 5 illustrates another embodiment of a cuvette 500 in accordance with the invention. In this embodiment, the photonic crystal 501 is an integrated part of the cuvette container 102. As such, the container part 102 acts as a substrate for the grating part. The principles are entirely the same as described above for a photonic crystal 101 attached to the container part 102. Both transmission and reflection setups can be used. The electromagnetic equations are also similar, but take into account the different geometry and material choices.

Figure 6:
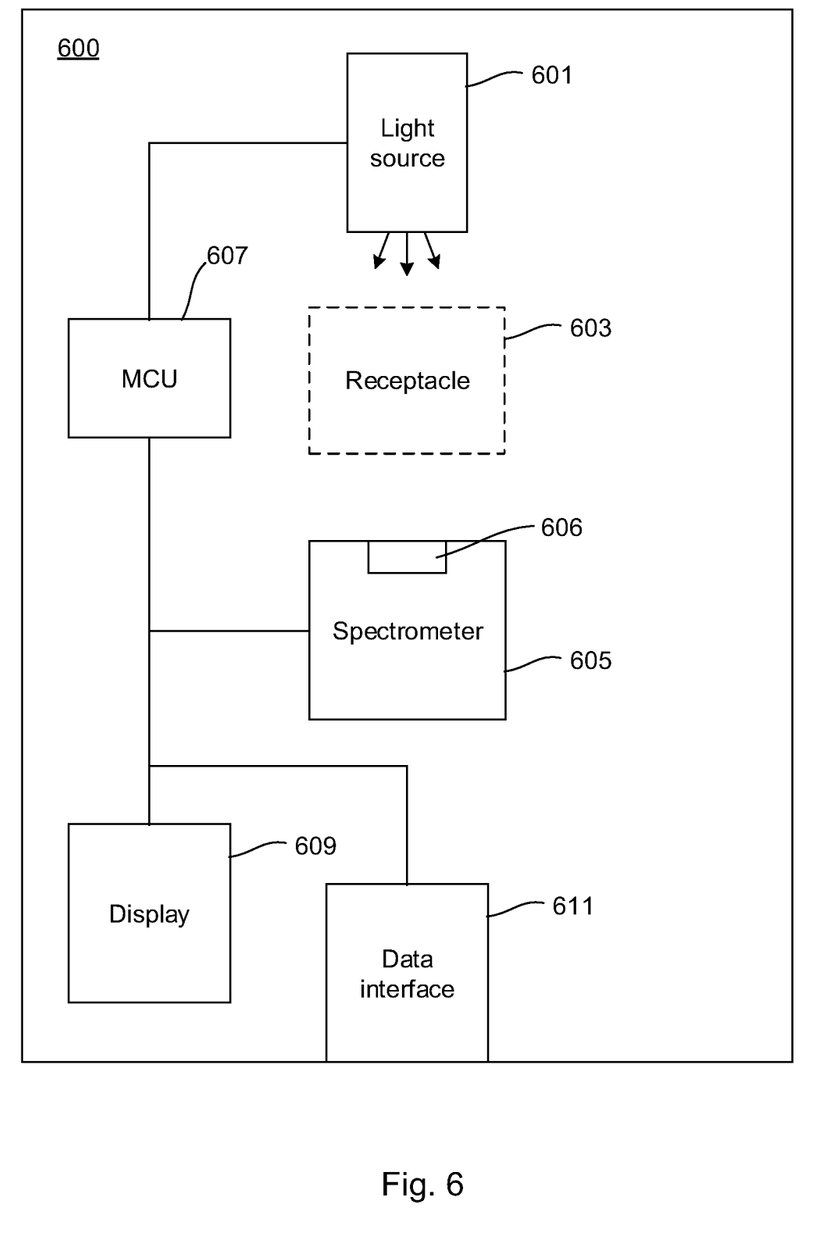
FIG. 6 illustrates schematically a spectrophotometer in accordance with an embodiment of the invention.

FIG. 6 illustrates schematically a standard spectrophotometer 600. It has a light source 601, a receptacle 603 for receiving a cuvette, and a spectrometer 605 with a light entry window 606 arranged to receive light from the cuvette, and a microcontroller (MCU) 607. This spectrophotometer also has a display 609 for displaying information related to measurements from the spectrometer. It also has a data interface 611 allowing data to be transferred from the spectrophotometer to another device. It may also be configured to receive data from an external device. This could for instance be software for controlling the operation of the MCU (often referred to as firmware). The data interface may be wireless or configured to be used with a cable.

The spectrometer in FIG. 6 is in accordance with an embodiment of the invention, although this is not readily apparent. The MCU can be specifically configured to be capable of internally performing the calculations described above for determining the refractive index or concentration based on measurements obtained by the spectrometer with a nanocuvette in the receptacle, or the calculation can be done externally after transfer of a measured spectrum.

Figure 7:
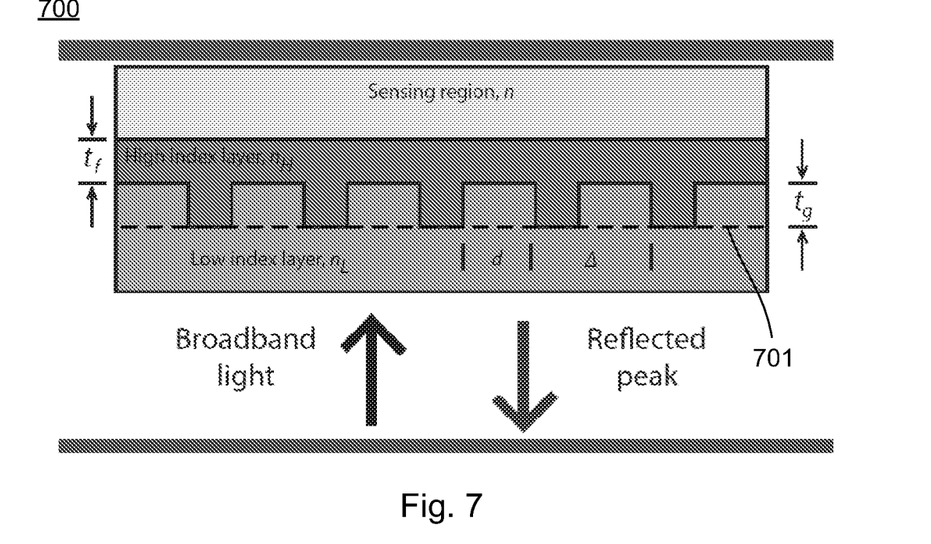
FIG. 7 illustrates schematically a photonic crystal suitable for use in a cuvette in accordance with an embodiment of the invention.

FIG. 7 illustrates schematically a photonic crystal 700 for use in a cuvette in accordance with an embodiment of the invention. It comprises a low index layer having an index of refraction $n_L$. There is a substrate part and a grating part on top of the substrate part. The grating part also comprises a high index material having an index of refraction, $n_H$. Above the grating part, there is a layer of high index material. An example of a photonic crystal is described below. In that example, the substrate part is made of PMMA. The grating is further characterized by a grating height, $t_g$, a thickness, $t_f$, of the high index layer, a grating duty cycle, d, and a grating constant, $\Delta$. The grating may be planar, and the dashed line 701 indicates the grating's plane. FIG. 7 also illustrates schematically a "sensing region". This is to indicate that this region, which comprises sample fluid during a measurement, affects the measured index of refraction.

Figure 8:
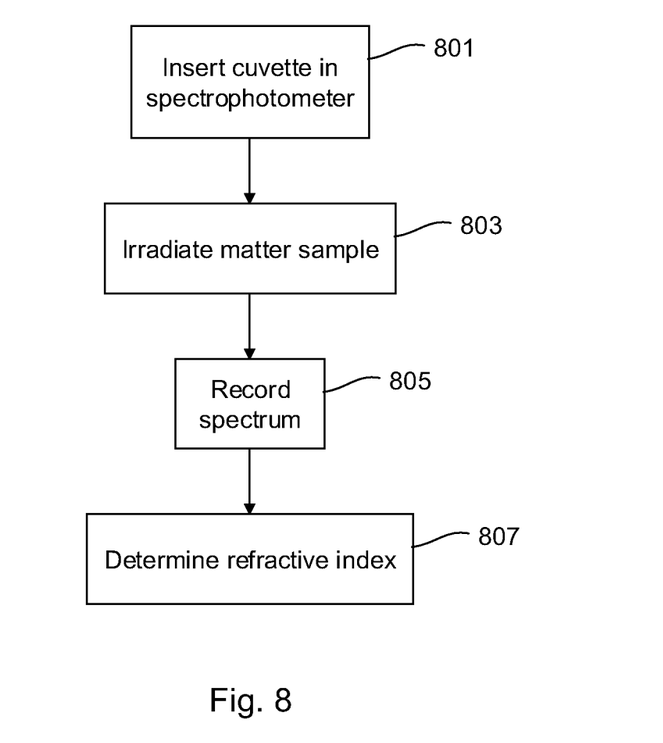
FIG. 8 illustrates a method for determining a refractive index of a sample using a cuvette in a spectrometer.

FIG. 8 illustrates a measurement method in accordance with an embodiment of the invention. The method is for obtaining a refractive index of a fluid sample. In step 801, a nanocuvette with a sample is inserted into the receptacle of a spectrophotometer. Then, in step 803, the sample is irradiated by the spectrophotometer light source. Light transmitted through the photonic crystal and fluid sample reaches the spectrometer, where it is characterized. Finally, in step 807, the refractive index is determined based on characteristics of the photonic crystal and on the measured spectrum. The determining is described earlier in this document.

Figure 9:
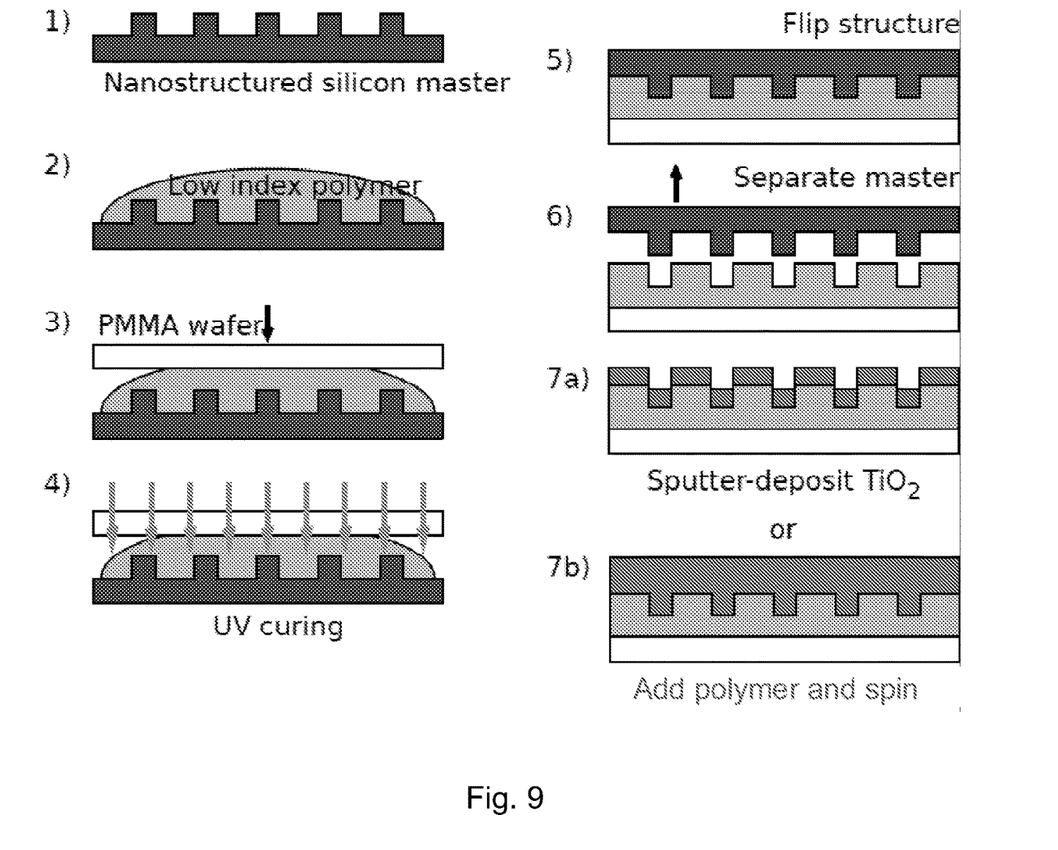
FIG. 9 illustrates two methods of fabricating photonic crystals suitable for use in a cuvette in accordance with an embodiment of the invention.

FIG. 9 illustrates a method of fabricating a photonic crystal for use as a photonic crystal in a nanocuvette. Step 1 illustrates the provision of an anti-stiction coated grating master. In step 2, a liquid low refractive index polymer is added on the master. In step 3, a flat transparent substrate, for instance comprising PMMA or glass, is pressed onto the liquid low refractive index polymer. This causes the liquid low refractive index polymer to become flattened. Next, in step 4, radiation is used in order to cure the liquid low refractive index polymer, producing a solid low refractive index polymer layer that is attached to both the master and the substrate. In step 5+6, the anti-stiction coated master is detached from the cured low refractive index polymer layer, exposing the grating structure. In step 7a, $TiO_2$ is sputtered onto the grating structure. The result is a corrugated top layer.

An alternative nanocuvette fabrication step is illustrated in FIG. 9's step 7b. Instead of sputtering $TiO_2$ onto the grating structure, a high refractive index polymer is added on the now-exposed grating structure and spun in order to obtain a flat layer.

Figure 10:
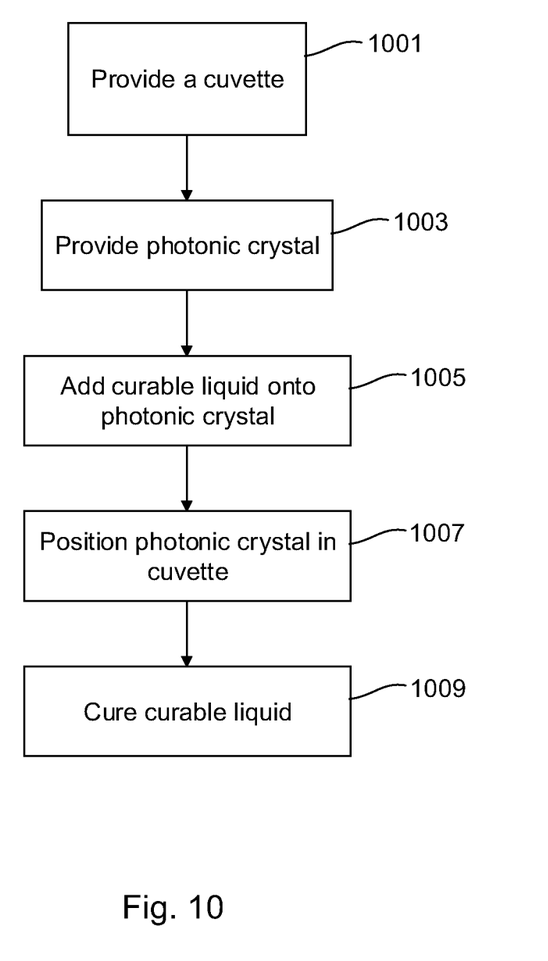
FIG. 10 illustrates an embodiment of a method of manufacturing a cuvette.

FIG. 10 illustrates a method for manufacturing a nanocuvette. The method comprises, in step 1001, providing a cuvette having a container part for holding a fluid sample. In step 1003, a photonic crystal is provided. Curable liquid is then added to the photonic crystal on the side opposite the grating part, in step 1005. Next, in step 1007, the photonic crystal with curable liquid is positioned inside the container part of the cuvette where a fluid sample will get into contact with the photonic crystal. Then, in step 1009, the curable liquid is exposed to curing radiation that cures the curable liquid, whereby the photonic crystal becomes rigidly attached to the container part.

Other embodiments of the manufacturing method include the same steps, but performed in a different order, where possible. Those embodiments are encompassed by the corresponding claim(s).

"Spectrophotometer" shall be construed broadly as being a single apparatus or a collection of two or more separate electrical hardware apparatuses that in combination can carry out one or more of the described methods.

The invention claimed is:
1. A cuvette configured to determine a refractive index of a sample in a spectrophotometer, comprising:

a container for holding the sample, the container having:
  a square footprint defined by a bottom wall, four side walls and an opening arranged opposite the bottom,
  an entry window arranged in a first side wall that allows input radiation to reach the sample, the container furthermore having an exit window arranged in a second side wall opposite the first side wall that allows a part of the input radiation to exit the container part, the entry window and the exit window defining a radiation path, and
  a photonic crystal rigidly attached to the first or second side wall of the container or integrally formed in the first or second side wall of the container and arranged in the radiation path, the photonic crystal having a grating part causing a reflectance spectrum of the photonic crystal to exhibit a resonance.

2. The cuvette in accordance with claim 1, wherein the cuvette is configured to be insertable into a spectrophotometer in a first configuration and in a second configuration, wherein in the first configuration the photonic crystal is in a radiation path of the spectrophotometer, and in the second configuration the photonic crystal is not in a radiation path of the spectrophotometer.

3. The cuvette in accordance with claim 1, wherein the grating part is formed at least partially from a polymer material.

4. The cuvette in accordance with claim 1, wherein the grating part is a planar grating and wherein the photonic crystal is arranged so that the planar grating is normal to the radiation path.

5. The cuvette in accordance with claim 1, wherein the grating part is a planar grating and wherein the photonic crystal is arranged so that a normal to the planar grating is within 10 degrees of a normal to a surface part of the container to which the photonic crystal is attached.

6. The cuvette in accordance with claim 1, wherein the cuvette is configured so that the radiation path coincides with a path followed by radiation from a spectrophotometer light source in a spectrophotometer in which the cuvette is suitable.

7. A spectrophotometer for characterizing a refractive index of a sample, comprising:
  a cuvette receptacle configured to receive a cuvette, which cuvette comprises:
    a container for holding the sample, the container having:
    a square footprint defined by a bottom wall, four side walls and an opening arranged opposite the bottom,
    an entry window arranged in a first side wall that allows input radiation to reach the sample, the container furthermore having an exit window arranged in a second side wall opposite the first side wall that allows a part of the input radiation to exit the container part, the entry window and the exit window defining a radiation path, and
    a photonic crystal rigidly attached to the first or second side wall of the container or integrally formed in the first or second side wall of the container and arranged in the radiation path, the photonic crystal having a grating part causing a reflectance spectrum of the photonic crystal to exhibit a resonance,
  a spectrophotometer light source arranged to provide input radiation along the radiation path of the cuvette, and
  a spectrometer arranged to receive non-absorbed parts of the input radiation from the exit window and to determine a spectrum based on said non-absorbed parts, and to determine a resonance wavelength or resonance frequency or other resonance property in the spectrum,
  wherein, the spectrophotometer is configured to determine the refractive index by solving a set of optical equations that utilize at least: 1) optical and physical characteristics of the photonic crystal, and 2) the determined resonance wavelength or resonance frequency or said other resonance property, wherein the refractive index is an unknown to be solved for in said set of optical equations.

8. The spectrophotometer in accordance with claim 7, further comprising a mirror system configured to guide input light reflected by the photonic crystal to the spectrometer.

9. A spectrophotometer configured to determine a concentration of a material in a sample, comprising
  a cuvette receptacle configured to receive a cuvette, which cuvette comprises:
    a container for holding the sample, the container having:
    a square footprint defined by a bottom wall, four side walls and an opening arranged opposite the bottom,
    an entry window arranged in a first side wall that allows input radiation to reach the sample, the container furthermore having an exit window arranged in a second side wall opposite the first side wall that allows a part of the input radiation to exit the container part, the entry window and the exit window defining a radiation path, and
    a photonic crystal rigidly attached to the first or second side wall of the container or integrally formed in the first or second side wall of the container and arranged in the radiation path, the photonic crystal having a grating part causing a reflectance spectrum of the photonic crystal to exhibit a resonance,
  a spectrophotometer light source arranged to provide input radiation along the radiation path of the cuvette, and
  a spectrometer arranged to receive non-absorbed parts of the input radiation from the exit window and to determine a spectrum based on said non-absorbed parts, and to determine a resonance wavelength or resonance frequency or other resonance property in the spectrum,
  wherein the spectrophotometer is also configured to determine the concentration by solving a set of optical equations that utilize at least: 1) optical and physical characteristics of the photonic crystal, 2) the determined resonance wavelength or resonance frequency or said other resonance property, and 3) a predetermined relationship for converting, for said material, the resonance wavelength or resonance frequency or said other resonance property determined by the spectrophotometer into a concentration of said material.

10. The spectrophotometer in accordance with claim 9, further comprising a selector unit allowing a user to select between at least two different materials or mixture of materials, and in response, the spectrophotometer determines the concentration by using the predetermined relationship corresponding to the selected material or mixture of materials.

* * * * *